United States Patent [19]

Roark et al.

[11] Patent Number: 4,657,948

[45] Date of Patent: Apr. 14, 1987

[54] FLUID LOSS CONTROL IN WELL CEMENT SLURRIES

[75] Inventors: David N. Roark; Adam Nugent, Jr.; Baldev K. Bandlish, all of Baton Rouge, La.

[73] Assignee: Ethyl Corporation, Richmond, Va.

[21] Appl. No.: 779,140

[22] Filed: Sep. 23, 1985

Related U.S. Application Data

[63] Continuation-in-part of Ser. No. 732,096, May 9, 1985.

[51] Int. Cl.$^4$ ................................................ C09K 7/00
[52] U.S. Cl. ..................................... 523/130; 524/72; 524/73; 525/189
[58] Field of Search ................... 523/130; 525/189; 524/72, 73

[56] References Cited

U.S. PATENT DOCUMENTS

| | | |
|---|---|---|
| 2,456,428 | 12/1948 | Parker . |
| 2,614,998 | 10/1952 | Lea . |
| 2,662,875 | 12/1953 | Chaney . |
| 2,745,815 | 5/1956 | Mussell . |
| 2,800,963 | 7/1957 | Roberts et al. . |
| 3,062,798 | 11/1962 | Lovett . |
| 3,242,986 | 3/1966 | Hower . |
| 3,254,719 | 6/1966 | Root . |
| 3,271,307 | 9/1966 | Dickson et al. . |
| 3,287,145 | 11/1966 | Fischer . |
| 3,302,719 | 2/1967 | Fischer . |
| 3,316,965 | 5/1967 | Watanabe et al. . |
| 3,342,263 | 5/1965 | Fischer . |
| 3,353,604 | 11/1967 | Gibson . |
| 3,359,225 | 12/1967 | Weisend . |
| 3,363,690 | 1/1968 | Fischer . |
| 3,392,096 | 7/1968 | Lawton et al. ..................... 521/38 |
| 3,455,390 | 7/1969 | Gallus . |
| 3,465,825 | 9/1969 | Hook et al. . |
| 3,491,049 | 1/1970 | Gibson . |
| 3,500,929 | 3/1970 | Eilers et al. . |
| 3,511,313 | 5/1970 | Eilers et al. . |
| 3,511,314 | 5/1970 | Scott, Jr. et al. . |
| 3,593,794 | 7/1971 | Fischer . |
| 3,601,194 | 8/1971 | Gallus . |
| 3,630,280 | 12/1971 | Fischer et al. . |
| 3,707,878 | 10/1968 | Engle . |
| 3,753,903 | 8/1973 | Fischer et al. . |
| 3,856,088 | 12/1974 | Frisque . |
| 3,870,668 | 3/1975 | Fischer et al. . |
| 3,878,895 | 4/1975 | Wieland et al. . |
| 3,882,029 | 5/1975 | Fischer et al. . |
| 3,923,100 | 12/1975 | Bellos et al. . |
| 3,931,096 | 1/1976 | Guilbault et al. . |
| 3,943,083 | 3/1976 | Adams et al. . |
| 3,952,805 | 4/1976 | Persinski et al. . |
| 3,979,304 | 9/1976 | Fischer et al. . |
| 3,979,305 | 9/1976 | Fischer et al. . |
| 3,994,852 | 11/1976 | Adams et al. . |
| 3,998,773 | 12/1976 | Crinkelmeyer . |
| 4,012,327 | 3/1977 | Boothe . |
| 4,015,991 | 4/1977 | Persinski et al. . |
| 4,018,826 | 4/1977 | Gless, Jr. et al. . |
| 4,024,918 | 5/1977 | Crinkelmeyer . |
| 4,036,660 | 7/1977 | Persinski et al. . |
| 4,131,578 | 12/1978 | Crinkelmeyer et al. . |
| 4,329,441 | 5/1982 | Bergthaller . |
| 4,393,939 | 7/1983 | Smith et al. . |
| 4,413,681 | 11/1983 | McKenzie . |
| 4,461,856 | 7/1984 | Willis et al. . |
| 4,469,518 | 9/1984 | McKenzie . |
| 4,482,381 | 11/1984 | Spitz et al. . |
| 4,504,640 | 3/1985 | Harada et al. . |
| 4,519,843 | 5/1985 | Willis et al. . |
| 4,528,347 | 7/1985 | Harada et al. . |
| 4,540,760 | 9/1985 | Harada et al. ..................... 526/219 |

FOREIGN PATENT DOCUMENTS

| | | |
|---|---|---|
| 95233 | 11/1983 | European Pat. Off. . |
| 131306 | 1/1985 | European Pat. Off. . |

OTHER PUBLICATIONS

McKenzie et al, Oil and Gas Journal, Mar. 29, 1982, pp. 146–148.

S. Harada & S. Hasegawa, Macromolecular Chem. Rapid Communications, 5, 27–31 (1984).

Polyallylamine Hydrochloride, Nitto Boseki, Ltd., pp. 1–8.

R. C. Laible, Allyl Polymerizations, Chem. Rev., 58 (5) 807–843 (1958).

C. M. Stout & W. W. Wahl, Journal of Petroleum Technology, Sep. 1960, pp. 20–24.

C. E. Schildknecht, Allyl Compounds and Their Polymers, Wiley, Interscience Pub., Copyright 1973, pp. 29–30 and 523–524.

*Primary Examiner*—Joseph L. Schofer
*Assistant Examiner*—N. Sarofim
*Attorney, Agent, or Firm*—Donald L. Johnson; John F. Sieberth

[57] ABSTRACT

A polymer of monoallylamine, preferably a water-soluble polymer of monoallylamine, whether in free (i.e., unneutralized) form or in salt (i.e., partially or completely neutralized) form is used in conjunction with a sulfonated polymer such as a water-soluble lignosulfonate, condensed naphthalene sulfonate, or sulfonated vinyl aromatic polymer, to minimize fluid loss from the slurry during subterranean well cementing operations. The polymer of monoallyl amine may be a homopolymer or a copolymer, and may be crosslinked or uncrosslinked. These components interact with each other in the presence of water to produce a gelatinous material that tends to plug porous zones and minimize premature water loss from the well cement slurry when present in the subterranean well formation. In addition, the gelatinous material so formed prevents de-stabilization of the slurry in the well formation.

66 Claims, No Drawings

FLUID LOSS CONTROL IN WELL CEMENT SLURRIES

REFERENCE TO PRIOR APPLICATION

This is a continuation-in-part of prior copending application Ser. No. 732,096, filed May 9, 1985.

TECHNICAL FIELD

This invention relates to methods for controlling fluid loss in well cementing operations and to formulations particularly adapted for this use.

BACKGROUND

Over the years a number of low fluid-loss systems, formulations, and application techniques have been developed for permanent-type well completions and in more recent times, for conventional wells. See in this connection, D. K. Smith, *Cementing*, Society of Petroleum Engineers of AIME, pub., New York and Dallas, 1976, and C. M. Stout and W. W. Wahl, *Journal of Petroleum Technology*, Sept. 1960, pages 20–24, all disclosures of both of which are incorporated herein by reference.

Among the leading systems for controlling fluid loss in well cementing operations are systems based on polyalkylene polyamines, polyalkylene polyimines, and mixtures thereof. See for example Gibson et al U.S. Pat. No. 3,491,049; Scott et al U.S. Pat. No. 3,511,314; Crinkelmeyer et al U.S. Pat. No. 4,131,578; McKenzie U.S. Pat. No. 4,413,681; Spitz et al U.S. Pat. No. 4,482,381; and McKenzie et al, *Oil & Gas Journal*, March 1982, pages 146–148.

As pointed out in the Spitz et al '381 patent, the liquid polyamines of this type require addition of sulfonated polymers to provide effective fluid loss control. While such combinations do function to control fluid loss, they cause destabilization of the cement slurry. In order to ameliorate this problem the manufacturers of the polyalkylene polyamines and polyalkylene polyimines resorted to chemical modification of these polymers by cross-linking. Unfortunately the additional processing required increased the cost of the materials quite significantly.

THE INVENTION

In accordance with this invention new, highly effective fluid-loss-control additive systems have been discovered for use in cementing subterranean well formations with an aqueous well cement slurry. These additive systems are, in combination, (1) a sulfonated polymer and (2) a polymer of monoallylamine whether in free (i.e., unneutralized) form or in salt (i.e., partially or completely neutralized) form. Experiments have shown that this invention makes it possible to control very effectively the amount of fluid loss that would otherwise occur in an aqueous cement slurry when using neither such additive (1) or (2), or either such additive (1) or (2) in the absence of the other. In addition, tests have shown that de-stabilization of cement slurries was not experienced when using systems of this invention. In other words, the slurried cement does not tend to settle out to any significant extent prior to curing. Since sulfonated polymers are not only commercially available but are often used in downhole cement slurries, this invention makes it possible to overcome excessive fluid loss and achieve improved control of cementing treatments, all at relatively low cost.

As noted above, the polymer of monoallylamine used in the practice of this invention may be in the form of a free base (i.e., the pendant —$CH_2NH_2$ groups are not neutralized with an acid) or it may be in the form of a partially or completely neutralized polymer (i.e., some or all of the pendant —$CH_2NH_2$ groups are neutralized with an acid and thus are in salt form). Such salts are also known in the chemical arts as poly(monoallylammonium) salts.

Accordingly, a preferred group of polymers of monoallylamine used pursuant to this invention may be depicted by the general formula:

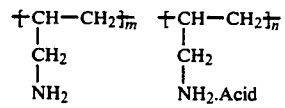

where m is a number from zero to 100,000 or more and n is a number from zero to 100,000 or more, the sum of m plus n being in the range of about 10 to about 100,000 or more. In the formula, Acid represents an organic or inorganic acid complexed with the amino group in the form of a salt. When n is zero or is very small relative to m, the polymer may be deemed for all practical purposes a poly(monoallylamine). On the other hand when m is zero or is very small relative to n, the polymer may be deemed for all practical purposes a salt of poly(monoallylamine). There is of course no hard and fast dividing line between the two since the transition from one end of the scale to the other is a continuum.

Other preferred polymers of monoallylamine used pursuant to this invention are polymers as above depicted that have been chemically modified during their manufacture by copolymerization with small quantities of suitable polymerizable comonomers containing two or more double bonds in the molecule (e.g., triallylamine hydrochloride and the like) or by crosslinking or bridging with small quantities of a crosslinking agent having two or more groups reactable with the amino group (e.g., epichlorohydrin, ethylene dichloride, and the like). These chemically modified monoallylamine polymers have essentially the same properties and characteristics as the unmodified polymers depicted above except of course those related to molecular weight.

Unless the context indicates otherwise, all such polymers, whether in free or in salt form and whether in unmodified or modified (copolymerized, or crosslinked or bridged) form, will be collectively referred to hereinafter as a "polymer of monoallylamine".

In another of its embodiments this invention provides in a method of cementing a subterranean oil well formation with an aqueous well cement slurry, the improvement in which the slurry contains the combination of a sulfonated polymer and a polymer of monoallylamine, to provide controlled dehydration of the slurry during the well cementing operation. By treating an aqueous well cement slurry with suitable quantities of a sulfonated polymer and, for example, poly(monoallylamine) or poly(monoallylammonium) salt of appropriate molecular weight, the slurry has enhanced resistance to dehydration during the cementing operation.

A further embodiment of this invention involves the provision in an oil well cement formulation adapted for use in preparing well cement slurries of both a sulfonate polymer and a polymer of monoallylamine, to provide controlled dehydration of the slurry during the well cementing operation.

Still another embodiment of this invention involves providing in an oil well cement slurry adapted for use in a subterranean well cementing operation a fluid-loss-control substance formed by interaction in an aqueous medium of a sulfonated polymer and a polymer of monoallylamine, to provide a gelatinous substance capable of controlling dehydration of the slurry during the well cementing operation.

These and other embodiments of the invention will be still further apparent from the ensuing description and appended claims.

As will be shown hereinafter, even a polymer of monoallylamine that is essentially insoluble in water can be successfully used in the practice of this invention. In short, use may be made of any polymer of monoallylamine (i.e., poly(monoallylamine) or poly(monoallylammonium) salt, whether a homopolymer or a copolymer or a crosslinked homopolymer or copolymer) that forms a gelatinous substance in the presence of water and a sulfonated polymer. In general however it is preferred in the practice of this invention to use a water-soluole polymer of monoallylamine.

Illustrative polymers of monoallylamine include:
poly(monoallylamine)
poly(monoallylammonium chloride) (also referred to as polyallylamine hydrochloride)
poly(monoallylammonium bromide)
poly(monoallylammonium bisulfate)
poly(monoallylammonium sulfate)
poly(monoallylammonium nitrate)
poly(monoallylammonium dihydrogen phosphate)
poly(monoallylammonium hydrogen phosphate)
poly(monoallylammonium phosphate)
poly(monoallylammonium formate)
poly(monoallylammonium acetate)
poly(monoallylammonium propionate)
poly(monoallylammonium p-toluenesulfonate)
and like polymers. The water solubility of some salts such as the sulfate and phosphate salts of polymers of monoallylamine tends to decrease with increasing sulfate or phosphate content. In fact, completely neutralized poly(monoallylamine) sulfate (poly(monoallylammonium sulfate)) and completely neutralized poly(monoallylamine) phosphate (poly(monoallylammonium phosphate)) tend to be essentially water insoluble. The preferred polymeric salts are the hydrochlorides.

Polymers of monoallylamine falling within a wide range of molecular weights are suitable. For example, use may be made of polymers in salt form (e.g., unmodified poly(monoallylammonium hydrochloride) having a weight average molecular weight (as determined by the equilibrium sedimentation method—see B. Vollmert, *Polymer Chemistry*, Springer-Verlag, New York, Copyright 1973, pp 361-369)—ranging upwards from about 1,000, and preferably ranging upwards from about 7,000. Modified (e.g., suitably crosslinked) and unmodified polymers in salt form with weight average molecular weights below about 500,000 are preferred, those falling in the range of about 10,000 to about 200,000 being particularly preferred. The weight average molecular weight (same test method) of the free (i.e., unneutralized) uncrosslinked poly(monoallylamines) ranges upwards from about 600, preferably upwards from about 3,250, and most preferably upwards from about 4,500. Modified (e.g., suitably crosslinked) and unmodified polymers in free (i.e., non-salt) form with weight average molecular weights below about 325,000 are preferred. Polymers of monoallylamine having weight average molecular weights falling outside of the foregoing molecular weight ranges may also be used, provided of course that their suitability and efficacy are established, for example by performing a few tests.

Methods for the synthesis of polymers of monoallylamine (homopolymers and copolymers, both free bases and salts thereof, and crosslinked or bridged polymers thereof) have been reported in the literature. See for example U.S. Pat. No. 4,504,640 granted Mar. 12, 1985, U.S. Pat. No. 4,528,347 granted July 9, 1985, European Patent Application No. 95,233 published Nov. 30, 1983, European Patent Application 131,306, published Jan. 16, 1985, and S. Harada & S. Hasegawa, *Macromolecular Chem., Rapid Communications*, 5, 27-31 (1984), all such disclosures being incorporated herein by reference. One currently recommended procedure involves hydrochlorination of allylamine followed by radical polymerization of the resulting allylamine hydrochloride. To convert the hydrochloride salt to the free polyallylamine (e.g., from which other salts can readily be produced) either of two different procedures is usually employed. One involves treatment of the polyallylamine hydrochloride solution with an alkali base such as sodium hydroxide to form an aqueous solution of the sodium chloride salt which is then subjected to dialysis and lyophilization. The other method utilizes a strong basic ion exchange resin for converting the polyallylamine hydrochloride solution into the polyallylamine solution which is then subjected to lyophilization to produce the free polymer. Various molecular weight grades of polyallylamine and of polyallylamine hydrochloride are presently available from Nitto Boseki Co., Ltd., Tokyo, Japan.

In preparing the crosslinked polymers of monoallylamine, use may be made of a variety of crosslinking agents. For example use may be made of alpha,beta-epoxy-gamma-haloalkanes, e.g., 3-chloro-1,2-epoxypropane, 3-bromo-1,2-epoxypropane, and 3-iodo-1,2-epoxypropane; and their higher homologs such as 3-chloro-1,2-epoxybutane, 3-bromo-1,2-epoxybutane, 3-iodo-1,2-epoxybutane, 3-chloro-1,2-epoxypentane, 3-chloro-1,2-epoxyhexane, 3-chloro1,2-epoxyheptane, and the like. Likewise, dihaloalkanes may be employed for this purpose, a few typical examples being 1,2-dihaloethanes such as 1,2-dichloroethane (ethylene dichloride), 1,2-dibromoethane (ethylene dibromide), and 1-bromo-2-chloroethane; and their higher homologs such as 1,3-dichloropropane, 1,3-dibromopropane, 1,3-dichlorobutane, 1,4-dichlorobutane, 1,3-dibromobutane, 1,4-dibromobutane, 1,5-dichloropentane, 1,7-dichloro-4,4-dimethylheptane, and the like. Other crosslinking agents, such as dicarboxyl acid chlorides, mono or dialdehydes, and the like, known to those skilled in the art for crosslinking other polymeric materials, may also be used in effecting this crosslinking.

When producing crosslinked polymers of monoallylamine the amount of the crosslinking agent employed should be controlled so as to avoid the formation of excessively crosslinked products. Ordinarily the proportions used will fall in the range of about 50 to about 8,000 parts by weight of crosslinking agent per million parts by weight of the monoallylamine homopolymer or copolymer being subjected to crosslinking. Departures from this range are feasible, and may be found useful. Preferably, from about 250 to about 8,000 ppm of crosslinking agent is employed with poly(monoallylamine) having a weight average molecular weight in the range of about 5,000 to about 100,000, and from about 50 to about 250 ppm of crosslinking agent is employed with poly(monoallylamine) having a weight average molecular weight in the range of about 100,000 to about 350,000. In other words, it is desirable that the relative proportion of crosslinking agent to poly(monoallylamine) be inversely proportional to the weight average molecular weight of the poly(monoallylamine) being crosslinked.

The poly(monoallylamine) subjected to the crosslinking process may be preformed or it may be generated or formed in situ. Preferably the poly(monoallylamine) is formed by neutralizing or partially neutralizing a poly(monoallylammonium) salt such as:
poly(monoallylammonium) chloride)
poly(monoallylammonium) bromide)
poly(monoallylammonium) bisulfate)
poly(monoallylammonium) sulfate)
poly(monoallylammonium) nitrate)
poly(monoallylammonium) dihydrogen phosphate)
poly(monoallylammonium) hydrogen phosphate) and
poly(monoallylammonium) phosphate).
It is particularly desirable to form the poly(monoallylamine) in situ by rendering an aqueous medium containing one or more of these acid salts neutral or alkaline in pH by the addition of a suitably strong base such as sodium hydroxide, potassium hydroxide, or the like. The preferred polymers for this use are the poly(monoallylammonium chlorides).

Among the polymerizable comonomers that may be used in forming monoallylamine copolymers are diallylamine hydrochloride, triallylamine hydrochloride, and the like. The copolymers should contain at least 95% by weight and preferably at least 98% by weight of monoallylamine with the balance being one or more such comonomers.

Sulfonated polymers of various types are suitable for use in the practice of this invention. The most common sulfonated polymers for this use are the lignosulfonates (i.e., sulfonated lignins), the condensed naphthalene sulfonates, and the sulfonated vinylaromatic polymers.

The lignosulfonates are exemplified by the various salts of sulfonated lignin such as the alkali metal lignosulfonates, the alkaline earth metal lignosulfonates, and the ammonium lignosulfonates. These include calcium lignosulfonate, calcium sodium lignosulfonate, sodium lignosulfonate, magnesium lignosulfonate, calcium potassium lignosulfonate, barium lignosulfonate, potassium lignosulfonate, lithium lignosulfonate, etc., as well as lignosulfonates that have been modified with organic acids, and the like. Some of these materials, especially the lignins (salts of lignosulfonic acid which are derived from wood) and the lignosulfonates modified with organic acids, are available as articles of commerce. They are often used as cement retarders—i.e., as additives to prevent the cement from setting too quickly—or as additives to increase the pumpability of cement slurries in high-temperature wells. In the practice of this invention the lignosulfonates exhibit a new property, that of reacting with the polymer of monoallylamine in the aqueous system to create a gelatinous material that tends to plug porous zones and minimize water loss from the cement slurry.

The various condensed naphthalene sulfonates that may be employed are exemplified by the naphthalene sulfonic acid condensation products available commercially under the trade designation Lomar D. It is understood that these materials are condensation products of formaldehyde and mononaphthalene sulfonic acid. Such condensation products are indicated in U. S. Pat. No. 3,511,314 to have molecular weights between about 1,000 and 3,000 but use may be made of any condensed naphthalene sulfonate that reacts with the polymer of monoallylamine in the aqueous system to create a gelatinous material that tends to plug porous zones and minimize water loss from the cement slurry.

The sulfonated vinylaromatic polymers that may be used as the sulfonated polymeric component in the practice of this invention are exemplified by the sulfonated polystyrenes and sulfonated vinyltoluenes, which are preferably used in their water-soluble salt forms. As pointed out in U.S. Pat. No. 4,413,681 these substances can vary very widely in molecular weight, for example from 500,000 to 8,000,000, and suitable sulfonated polymers of this type are also available as articles of commerce.

In practicing this invention any suitable lignosulfonate, condensed naphthalene sulfonate, or sulfonated vinylaromatic polymer may be used either singly or in various combinations with each other. To determine the suitability of any given sulfonated polymer or mixture of sulfonated polymers, all that is required is to perform a few simple tests first to establish that the given sulfonated polymer or mixture of sulfonated polymers reacts with the polymer of monoallylamine in an aqueous system to create a gelatinous material and secondly to establish that the gelatinous material will tend to plug porous zones and minimize water loss from a cement slurry. Use of the standard test procedures referred to in the ensuing examples is deemed particularly desirable for these purposes.

For further details concerning sulfonated polymers of the types suitable for use in the practice of this invention, reference may be had, for example, to Gibson et al U.S. Pat. No. 3,491,049; Scott et al U.S. Pat. No. 3,511,314; Crinkelmeyer et al U.S. Pat. No. 4,131,578; McKenzie U.S. Pat. No. 4,413,681; Spitz et al U.S. Pat. No. 4,482,381; McKenzie et al, *Oil & Gas Journal*, March 1982, pages 146–148, and to the references cited therein, all disclosures relative to sulfonated polymers of all of which are incorporated herein by reference.

While not necessary, use may be made with water-soluble polymers of monoallylamine of supplemental additives that serve as in situ cross-linking agents for such polymers when the polymer and the cross-linking agent are combined in an aqueous medium especially at a somewhat elevated temperature (e.g., 50° to 100° C.). Examples of such cross-linking agents are ethylene dichloride, epichlorohydrin, ethylene dibromide, as well as other similar substances well known to those skilled in the art. Amounts of such cross-linking agents ranging from about $1 \times 10^{-4}$ to about $5 \times 10^{-3}$ moles per mole of poly(monoallylamine) or water-soluble salt thereof are generally sufficient to produce cross-linking to an extent suitable for this purpose.

In practicing this invention the polymer of monoallylamine may be premixed with the lignosulfonate and the mixture added (with or without other additives) to the dry cement or to the aqueous cement slurry or to the water to be used in forming the slurry. Alternatively, these additives may be introduced separately in either order or concurrently (with or without other additives) into the dry cement or into the aqueous cement slurry or into the water to be used in forming the slurry. For best results the aqueous cement slurries of this invention, irrespective of the method in which they are formulated, should be used in the cementing operation within a relatively short time after preparation, e.g., within a few hours. Since the additives react with each other in the presence of water to form a gelatinous phase, it is desirable to keep the formulations that contain both of them dry until the cement slurry is formed. For the same reason it is preferable to introduce at least one of these two types of additives into the slurry after it has been formed or while it is being formed, rather than introducing both before it is formed.

It is possible, though not essential, to include in the compositions of this invention conventional quantities of conventional additives used in well cement slurries. For example, materials such as calcium chloride, sodium chloride, plaster of Paris, sodium silicate ($Na_2SiO_3$), sea water, or the like, may be employed. A feature of this invention is that sea water may be used without adverse consequences, and this is advantageous in situations such as offshore drilling where sea water is plentiful. Other cementing additives may also be employed in the compositions of this invention, provided of course that they do not materially impair the effectiveness of the fluid-loss-control additive system of this invention with which they are employed. Among the other types of conventional additives that are deemed feasible for use in the compositions of this invention are light-weight additives (e.g., bentonite, diatomaceous earth, Gilsonite, coal, expanded perlite, nitrogen, fly ash, sodium silicate, etc.), heavy-weight additives (e.g., hematite, ilmenite, barite, sand, salt, etc.) cement retarders (e.g., carboxymethyl hydroxyethyl cellulose, saturated salt, borax, etc.), filtration control additives, cement dispersants (friction reducers), mud decontaminants, silica flour, radioactive tracers, dyes, hydrazine, fiber, gypsum, and others. The suitability and amount of a such ancillary additives will in many cases be readily apparent to those skilled in the art, and in any event can be readily determined by the simple expedient of running a few laboratory tests.

The amounts of the polymer of monoallylamine and of the sulfonated polymer used in the compositions of this invention may be varied within reasonable limits. When furnished in the form of an additive combination, the amount of polymer of monoallylamine) in the dry mixture will normally fall in the range of from about 0.05 to about 10 and preferably from about 1 to about 5 parts by weight per part by weight of the sulfonated polymer. The factor of chief importance is to use an amount of the sulfonated polymer that upon addition of water interacts with the amount of the polymer of monoallylamine being used in the formulation to form a gelatinous material that effectively minimizes fluid loss from the slurry during its use in a well cementing operation, yet does not cause the formation of an excessively viscous, unpumpable mixture. Accordingly, it is generally recommended that in the cement-containing systems of this invention the amount of polymer of monoallylamine fall in the range of from about 0.5 to about 10 (and preferably from about 1 to about 5) parts by weight per each 100 parts by weight of cement and the amount of sulfonated polymer fall in the range of from about 0.5 to about 10 (and preferably from about 1 to about 5 parts) by weight per each 100 parts by weight of cement, although departures from these ranges may be feasible and may be utilized if determined to be suitable in any given instance, for example by means of a few simple tests.

In order to demonstrate the efficacy of the fluid-loss-control additive systems of this invention, a group of tests were conducted using the standard test procedures essentially as described in API Specification for Materials and Testing for Well Cements, Section 5 entitled "Preparation of Slurry" (pages 16–17), Section 9 entitled "Atmospheric Pressure Consistometer" (page 32), and Appendix F entitled "Fluid-Loss Test (Tentative)" (pages 73–75). In these tests a Class H cement was used and a temperature of 150° F. was maintained during the 20 minute period in the consistometer. In essence, therefore, each test involved preparing the slurry including additive(s), transferring the slurry from the blender to the consistometer preheated to 150° F., stirring the slurry for 20 minutes, transferring the slurry from the consistometer to the preheated fluid-loss cell at 150° F., closing the cell, applying 1,000 psig to the top of the cylinder, and collecting and measuring the volume of the filtrate emanating from the bottom of the cell as a function of time.

The results of these tests are summarized in Table I. The additives used in the tests and the abbreviations applied to them in the table are as follows:

Fluid-Loss-Control Additives

A = Poly(monoallylamine hydrochloride), 150,000 Mw from Nitto Boseki Co. Ltd.
B = Poly(monoallylamine hydrochloride), 10,000 Mw from Nitto Boseki Co. Ltd.
C = Commercially-available fluid-loss-control additive; reportedly one of the best on the market
D = Another effective commercially-available fluid-loss-control additive.

Sulfonated Polymers

Lig = Lignosulfonate salts (mainly Na and Ca salts) available from Reed Lignin as Marasperse CK-22
Naph = A condensed naphthalene sulfonate available from Diamond Shamrock as Lomar D.

Other Additives $CaCl_2$ = Calcium chloride
NaCl Sodium chloride.

TABLE I

| | | | Cement Fluid-Loss Tests | | | | | |
|---|---|---|---|---|---|---|---|---|
| Ex. | Fluid-Loss Additive | | Sulfonated Polymer | | Other Additive | | Dehydration | Filtrate | Fluid Loss, |
| No. | Additive | Conc., wt % | Additive | Conc., wt % | Additive | Conc., wt % | Time, min. | Vol., mL | mL/30 min. |
| | Formulation Using Ingredients of This Invention | | | | | | | | |
| 1 | A | 1.35 | Lig | 1.00 | $CaCl_2$ | 0.3 | 0.83 | 35 | 210 |
| 2 | A | 2.00 | Lig | 1.63 | $CaCl_2$ | 0.3 | Test not run; System too viscous to mix | | |
| 3 | A | 2.00 | Lig | 0.66 | $CaCl_2$ | 0.3 | 8.00 | 32 | 62 |
| 4 | A | 1.23 | Lig | 0.66 | $CaCl_2$ | 0.3 | 0.38 | 34 | 299 |
| 5 | A | 2.00 | Naph | 0.50 | NaCl | 1.0 | 2.93 | 35 | 111 |
| 6 | A | 2.00 | Lig | 0.66 | $CaCl_2$ | 0.3 | 19.3 | 30 | 37 |

TABLE I-continued

| Ex. No. | Fluid-Loss Additive Additive | Fluid-Loss Additive Conc., wt % | Sulfonated Polymer Additive | Sulfonated Polymer Conc., wt % | Other Additive Additive | Other Additive Conc., wt % | Dehydration Time, min. | Filtrate Vol., mL | Fluid Loss, mL/30 min. |
|---|---|---|---|---|---|---|---|---|---|
| Cement Fluid-Loss Tests | | | | | | | | | |
| Control or Comparative Formulations | | | | | | | | | |
| 7 | None | None | None | None | None | None | 0.03 | 44 | —* |
| 8 | None | None | Lig | 0.66 | CaCl$_2$ | 0.3 | 0.09 | 40 | —* |
| 9 | A | 2.00 | None | None | None | None | 0.10 | 26 | —* |
| 10 | B | 1.23 | Lig | 0.66 | CaCl$_2$ | 0.3 | 0.10 | 40 | —* |
| 11 | C | 1.23 | Lig | 0.66 | None | None | 5.50 | 28 | 65 |
| 12 | C | 1.23 | None | None | None | None | 0.23 | 35 | ca 400 |
| 13 | D | 1.23 | Lig | 1.00 | CaCl$_2$ | 0.3 | 0.93 | 29 | 164 |

*Fluid loss so rapid that a calculated value has no significance

The data in Table I indicate that effective fluid loss control can be achieved by the practice of this invention. Example 2 illustrates the importance of avoiding use an excessive amount of the sulfonated polymer Other Additive CaCl$_2$ = Calcium chloride.

TABLE II

| Ex. No. | Fluid-Loss Additive Additive | Fluid-Loss Additive Conc., wt % | Sulfonated Polymer Additive | Sulfonated Polymer Conc., wt % | Other Additive Additive | Other Additive Conc., wt % | Dehydration Time, min. | Filtrate Vol., mL | Fluid Loss, mL/30 min. | Free* Water |
|---|---|---|---|---|---|---|---|---|---|---|
| Cement Fluid-Loss and Slurry Stability Tests | | | | | | | | | | |
| Formulations Using Ingredients of This Invention | | | | | | | | | | |
| 14 | B | 1.23 | Lig | 0.66 | CaCl$_2$ | 0.3 | 0.1 | 40 | 657 | — |
| 15 | B | 2.00 | Lig | 0.66 | None | — | 0.5 | 49 | 383 | 13 |
| 16 | E | 2.00 | Lig | 0.66 | None | — | 3.25 | 40 | 121 | 0 |
| 17 | F | 2.00 | Lig | 0.66 | None | — | 2.0 | 37.5 | 142 | 0 |
| 18 | F | 2.00 | Lig | 0.66 | CaCl$_2$ | 0.3 | 1.25 | 29 | 147 | 0 |
| Control or Comparative Formulations | | | | | | | | | | |
| 19 | None | None | Lig | 0.66 | None | — | 0.08 | 65 | 1249 | 42 |
| 20 | C | 1.23 | Lig | 0.66 | None | — | 0.5 | 33 | 192 | 0 |

*Expressed as mL of water that separated divided by the total volume in mL of the cement slurry, multiplied by 1000 when formulating the compositions of this invention. Examples 8 and 9 illustrate the need for utilizing both components of the fluid-loss-control systems of this invention. Example 10 indicates that in the particular system and proportions tested, poly(monoallylammonium chloride) with a weight average molecular weight above 10,000 would have been more suitable.

Another group of standard tests still further demonstrated the efficacy of this invention. Besides using the test procedures employed in Table I, in this group of tests the stabilities of the cement slurries were determined by use of the standard "Free Water" test as described in Section 6 of the API Specification for Materials and Testing for Well Cements, entitled "Determination of Free Water Content of Slurry". The results of this group of tests are summarized in Table II. The additives used in these tests and the abbreviations applied to them in Table II are as follows:

Fluid-Loss-Control Additives

B = Poly(monoallylamine hydrochloride), 10,000 Mw from Nitto Boseki Co. Ltd.
C = Commercially-available fluid-loss-control additive; reportedly one of the best on the market
E = Polyallylamine prepared from poly(monoallylammonium chloride), 10,000 Mw (from Nitto Boseki Co. Ltd.) neutralized to pH 9 with sodium hydroxide
F = Polyallylamine prepared from poly(monoallylammonium chloride), 150,000 $\overline{M}$w (from Nitto Boseki Co. Ltd.) neutralized to pH 9 with sodium hydroxide.

Sulfonated Polymer

Lig = Lignosulfonate salts available from Reed Lignin as Marasperse CK-22.

In Examples 14, 16–18 no evidence was seen of solids separation as indicated by streaking on inner graduated cylinder walls and there was no evidence of any settling of dense material in the bottom of the cylinder. In the control run of Example 19 significant water separation occurred. Also, Example 15 showed significant water separation indicating the need for calcium chloride with the poly(monoallylammonium chloride) used in this example.

A number of monoallylamine polymers were crosslinked and subjected to the foregoing test procedures. Examples 21 through 28 describe the manner by which these crosslinked polymers were formed.

EXAMPLE 21

A 33 weight percent solution of polyallylamine hydrochloride (Nitto Boseki Co., Ltd.) with a weight average molecular weight of 10,000 was prepared in a beaker using demineralized water. Using sodium hydroxide pellets, the pH of the solution was adjusted to 8.5. Then, 3,500 ppm of epichlorohydrin based on the weight of the original poly(monoallylammonium chloride) was added to the solution and the beaker was immersed in a preheated oil bath. Crosslinking was carried out at 75° C. for 30 minutes. The resulting solution was then cooled to 25° C. The resulting crosslinked product had an initial Brookfield Viscosity of 275 cps and subsequently became considerably more viscous.

EXAMPLE 22

The procedure of Example 21 was repeated in the same way with the exception that the proportion of the epichlorohydrin used was 5,000 ppm based on the weight of the initial poly(monoallylammonium chloride). The crosslinked product was a non-Newtonian fluid.

EXAMPLE 23

Utilizing the same procedure as in Example 21, polyallylamine hydrochloride (Nitto Boseki Co., Ltd.) having a weight average molecular weight of 150,000 was crosslinked with epichlorohydrin in the amount of 150 ppm based on the weight of the initial polyallylamine hydrochloride. The crosslinked product was a non-Newtonian fluid.

EXAMPLE 24

A 30 weight percent solution of polyallylamine hydrochloride (Nitto Boseki Co., Ltd.) with a weight average molecular weight of 10,000 was prepared in a beaker using demineralized water. The solution was 50% neutralized by adding sodium hydroxide pellets (22 wt %) which increased the pH to 9.1. After the NaOH dissolved, the solution was transferred to a round bottomed flask equipped with a reflux condenser, and 8,000 ppm of ethylene dichloride based on the weight of the original poly(monoallylammonium chloride) was added to the solution. The mixture was heated with stirring to 80° to 90° C. and held at this temperature for 30 to 60 minutes. The resulting solution was then cooled to 25° C. The crosslinked product exhibited an initial Brookfield Viscosity of 160 cps.

EXAMPLE 25

The procedure of Example 24 was repeated in the same way with the exception that the proportion of the ethylene dichloride used was 10,000 ppm based on the weight of the initial poly(monoallylammonium chloride). The crosslinked product gave an initial Brookfield Viscosity of 414 cps.

EXAMPLE 26

Utilizing the same procedure as in Example 24, polyallylamine hydrochloride (Nitto Boseki Co., Ltd.) having a weight average molecular weight of 150,000 was crosslinked with ethylene dichloride in the amount of 50 ppm based on the weight of the original polyallylamine hydrochloride.

EXAMPLE 27

The procedure of Example 26 was repeated in the same way with the exception that the proportion of the ethylene dichloride used was 100 ppm based on the weight of the original monoallylamine polymer. The crosslinked product gave a Brookfield Viscosity of 1.5 million cps.

EXAMPLE 28

The procedure of Example 27 was repeated in the same way except that in this case the proportion of the ethylene dichloride used was 300 ppm based on the weight of the original monooallylamine polymer. The crosslinked product exhibited a Brookfield Viscosity of over 8 million cps.

The fluid-loss-control additives of Examples 21, 22 and 23, a commercially available polyethyleneimine fluid-loss-control additive (Additive "A"), and a commercially available polyethylene polyamine fluid-loss-control additive (Additive "B") were tested as above. In addition, control tests were run wherein no fluid-loss-control additive was used. All tests samples contained lignosulfonate salt available from Reed Lignin as Marasperse CK-22.

The results of these tests are summarized in Table III.

TABLE III

| Cement Fluid-Loss and Slurry Stability Tests | | | | | | | |
|---|---|---|---|---|---|---|---|
| Fluid-Loss Control | | Lignosulfonate | Other Additive | | Dehydration | Filtrate | Fluid Loss, | Free* |
| Additive | Conc., wt % | Conc., wt % | Additive | Conc., wt % | Time, min. | Vol., mL | mL/30 min. | Water |
| Ex. 21 | 2.0 | 0.66 | None | — | 30 | 17 | 17 | 18 |
| Ex. 22 | 2.0 | 0.66 | None | — | 24 | 29 | 32 | 0 |
| Ex. 23 | 2.0 | 0.66 | None | — | 30 | 17 | 17 | 0 |
| A | 1.23 | 1.0 | CaCl$_2$ | 0.3 | 0.93 | 29 | 164 | — |
| B | 1.23 | 0.66 | None | — | 5.5 | 28 | 65 | — |
| None | None | 0.66 | None | — | 0.08 | 65 | 1249 | 42 |

*Expressed as mL of water that separated divided by the total volume in mL of the cement slurry, multiplied by 1000

In another series of tests the crosslinked products of Examples 24 through 28 inclusive were subjected to the fluid loss test procedure referred to above. A commercially-available fluid-loss-control additive was also tested, as was a sample of polyallylamine hydrochloride ("PAA-HCl") as received from Nitto Boseki Co., Ltd. Each composition tested contained 0.66 weight percent of lignosulfonate salt. Table IV summarizes the results of this group of tests.

TABLE IV

| Cement Fluid-Loss Tests | | | | |
|---|---|---|---|---|
| Fluid-Loss- Control Additive | | Dehydration | Filtrate | Fluid Loss, |
| Additive | Conc., wt % | Time, min. | Vol., mL | mL/30 min. |
| Ex. 24 | 2.0 | 5 | 47 | 114 |
| Ex. 25 | 2.0 | 3.5 | 28 | 82 |
| Ex. 26 | 1.0 | 0.11 | 30 | 500 |
| Ex. 27 | 1.5 | 1.25 | 27 | 132 |
| Ex. 28 | 2.0 | 2.3 | 26 | 93 |
| PAA-HCl | 2.0 | 35 | 30 | 28 |
| Comm'l | 2.0 | 60 | 20 | 17 |

As noted above, even essentially water-insoluble polymers of monoallylamine can be used in the practice of this invention. To illustrate, the essentially water-insoluble phosphate and sulfate polymers were prepared from allylammonium phosphate and allylammonium sulfate using the procedures reported in U.S. Pat. No. 4,504,640. In addition, a sample of the phosphate polymer was converted to the water-soluble hydrochloride polymer (intrinsic viscosity 0.419) by treatment with concentrated hydrochloric acid. The hydrochloride polymer ("PAAH") and both essentially water-insoluble products, poly(monoallylammonium phosphate) ("PAAP") and poly(monoallylammonium sulfate) ("PAAS"), as well as 10,000 Mw polyallylamine hydrochloride ("PAA-HCl", Nitto Boseki Co., Ltd.), were subjected to the same standard test procedures previously described, with but one exception. Since PAAP and PAAS are essentially water insoluble, each was ground in a Waring blender in the presence of dry Portland cement before mixing with water. The sulfonate polymer used was sodium lignosulfonate ("Lig"). The test results, in which some of the systems additionally contained sodium chloride, are shown in Table V.

TABLE V

| Fluid-Loss-Control Additive | | Cement Fluid-Loss Tests | | | | |
|---|---|---|---|---|---|---|
| Additive | Conc. wt % | Lig Conc. wt % | NaCl Conc. wt % | Dehydration Time, min. | Filtrate Vol., mL | Fluid Loss, mL/30 min. |
| None | — | — | — | 0.06 | 42 | 955 to 1200 |
| None | — | — | 1.5 | 0.06 | 26 | 581 |
| PAAP | 3.5 | — | — | 0.07 | 29.5 | 626 |
| PAAP | 3.5 | — | 1.5 | 0.25 | 28 | 307 |
| PAAP | 3.5 | 0.66 | 1.5 | 0.31 | 28.5 | 281 |
| PAAP | 2.5 | — | 1.5 | 0.12 | 28 | 450 |
| PAAS | 3.5 | — | — | 0.07 | 31 | 658 |
| PAAS | 3.5 | 0.66 | — | 0.28 | 37 | 380 |
| PAAH | 2.0 | 0.66 | — | 12.3 | 33.5 | 52 |
| PAA-HCl | 2.0 | 0.66 | — | 0.5 | 49 | 383 |

As will now be readily apparent to those skilled in the art, the fluid-loss-control additive systems of this invention may be employed with a wide variety of conventional well cements, including those of API Classes A through F, whether of the Ordinary, Moderate, or High Sulfate Resistant Types.

In the practice of this invention use may be made of mixtures of different polymers of monoallylamine of the type referred to hereinabove. Likewise, in the practice of this invention the sulfonated polymer may be (a) a mixture of two or more different lignosulfonates, (b) a mixture of two or more different condensed naphthalene sulfonates, (c) a mixture of two or more different sulfonated vinyl aromatic polymers, (d) a mixture of one or more lignosulfonates and one or more condensed naphthalene sulfonates, (e) a mixture of one or more lignosulfonates and one or more sulfonated vinyl aromatic polymers, (f) a mixture of one or more condensed naphthalene sulfonates and one or more sulfonated vinyl aromatic polymers, (g) a mixture of one or more lignosulfonates, one or more condensed naphthalene sulfonates and one or more sulfonated vinyl aromatic polymers, or the like. It will also be appreciated that previously known fluid-loss-control additives may be used in conjunction with the fluid-loss-control additive combinations of this invention, provided of course that each previously known fluid-loss-control additive so used does not significantly impair the effectiveness of the system(s) of this invention with which it is used.

This invention is susceptible to considerable variation in its practice within the spirit and scope of the appended claims.

What is claimed is:

1. A fluid-loss-control additive adapted for use in cementing subterranean well formations with an aqueous well cement slurry, which additve comprises in combination, an anydrous mixture of (i) a lignosulfonate polymer or a condensed naphthalene sulfonate polymer or a sulfonated vinylaromatic polymer or any combination thereof and (ii) an unmodified or a chemically modified polymer of monoallylamine represented by the general formula:

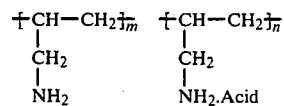

where m is a number from zero to 100,000 and n is a number from zero to 100,000, the sum of m plus n being in the range of about 10 to about 100,000, said polymer of monoallylamine, when chemically modified, being further characterized by (a) containing small quantities of polymerizable comonomer containing two or more double bonds in the molecule, or (b) being crosslinked or bridged with small quantities of a crosslinking agent having two or more groups reactable with the amino group.

2. A composition of claim 1 further including calcium chloride or sodium chloride, or both.

3. A composition of claim 1 in which component (i) consists essentially of a water-soluble lignosulfonate.

4. A composition of claim 1 in which component (i) consists essentially of sodium lignosulfonate or calcium lignosulfonate, or both.

5. A composition of claim 1 in which component (i) consists essentially of a condensed naphthalene sulfonate.

6. A composition of claim 1 in which said polymer of monoallylamine is crosslinked with a crosslinking agent having two or more groups reactable with the amino group.

7. A composition of claim 1 in which the polymer of monoallylamine is a water-soluble polymer of monoallylamine.

8. A composition of claim 7 further including calcium chloride or sodium chloride, or both.

9. A composition of claim 7 in which component (i) consists essentially of a water-soluble lignosulfonate.

10. A composition of claim 7 in which the component (i) consists essentially of a condensed naphthalene sulfonate.

11. A composition of claim 7 in which the polymer of monoallylamine consists essentially of poly(monoallylamine) or poly(monoallylammonium chloride), or both.

12. A composition of claim 7 in which the polymer of monoallylamine consists essentially of water-soluble poly(monoallylamine) having a weight average molecular weight falling in the range of about 4,500 to about 325,000, a water-soluble salt of poly(monoallylamine) having a weight average molecular weight falling in the range of about 7,000 to about 500,000, or both.

13. A composition of claim 7 in which the amount of component (ii) falls in the range of from about 0.05 to about 10 parts by weight per each part by weight of component (i).

14. A composition of claim 13 in which component (i) consists essentially of sodium lignosulfonate or calcium lignosulfonate, or both; in which component (ii) consists essentially of poly(monoallylamine) or poly(monoallylammonium chloride), or both; and in which the composition further includes calcium chloride or sodium chloride, or both.

15. A composition of claim 1 in which the polymer of monallylamine is an essentially water-insoluble polymer of monallylamine.

16. In a process of producing an aqueous well cement slurry for use in cementing subterranean well formations, the improvement which comprises incorporating into the slurry (i) a sulfonated polymer and (ii) a polymer of monoallylamine; components (i) and (ii) being capable of producing, being present in an amount sufficient to produce, and producing upon contact with water, a gelatinous material that tends to plug porous zones anc minimize premature water loss from the well cement slurry when present in the subterranean well formation.

17. A process of claim 16 characterized by further including in the slurry at least calcium chloride or sodium chloride, or both.

18. A process of claim 16 in which the sulfonated polymer consists essentially of a water-soluble lignosulfonate.

19. A process of claim 16 in which the sulfonated polymer consists essentially of sodium lignosulfonate or calcium lignosulfonate, or both.

20. A process of claim 16 in which the sulfonated polymer consists essentially of a condensed naphthalene sulfonate.

21. A process of claim 16 in which the polymer of monoallylamine is represented by the general formula:

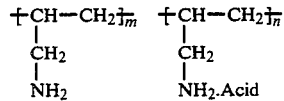

where m is a number from zero to 100,000 and n is a number from zero to 100,000, the sum of m plus n being in the range of about 10 to about 100,000.

22. A process of claim 21 in which said polymer is crosslinked with a crosslinking agent having two or more groups reactable with the amino group.

23. A process of claim 16 in which the polymer of monoallylamine is a water-soluble polymer of monoallylamine.

24. A process of claim 23 further including calcium chloride or sodium chloride, or both.

25. A process of claim 23 in which the sulfonated polymer consists essentially of a water-soluble lignosulfonate.

26. A process of claim 23 in which the sulfonated polymer consists essentially of a condensed naphthalene sulfonate.

27. A process of claim 23 in which the polymer of monoallylamine consists essentially of poly(monoallylamine) or poly(monoallylammonium chloride), or both.

28. A process of claim 23 in which the polymer of monoallylamine consists essentially of water-soluble poly(monoallylamine) having a weight average molecular weight falling in the range of about 4,500 to about 325,000, a water-soluble salt of poly(monoallylamine) having a weight average molecular weight . falling in the range of about 7,000 to about 500,000, or both.

29. A process of claim 23 in which the amount of component (ii) used falls in the range of from about 0.05 to about 10 parts by weight per each part by weight of component (i) used.

30. A process of claim 29 in which component (i) consists essentially of sodium lignosulfonate or calcium lignosulfonate, or both; in which component (ii) consists essentially of poly(monoallylamine) or poly(monoallylammonium chloride), or both; and in which the composition further includes calcium chloride or sodium chloride, or both.

31. A process of claim 16 in which the polymer of monoallylamine is an essentially water-insoluble polymer of monoallylamine.

32. In an aqueous well cement slurry for use in cementing subterranean well formations, the improvement characterized in that the slurry contains a gelatinous material that tends to plug porous zones and minimize premature water loss from the well cement slurry when present in the subterranean well formation, said gelatinous material having been formed by interaction in the presence of water between (i) a sulfonated polymer and (ii) a polymer of monoallylamine.

33. In an aqueous well cement slurry for use in cementing subterranean well formations, the improvement characterized in that the slurry contains a gelatinous material that tends to plug porous zones and minimize premature water loss from the well cement slurry when present in the subterranean well formation, said gelatinous material having been formed by interaction between (i) a sulfonated polymer and (ii) a water-soluble polymer of monoallylamine.

34. A composition of claim 33 characterized in that the slurry further includes at least calcium chloride or sodium chloride, or both.

35. A composition of claim 33 in which the sulfonated polymer (i) used for forming said gelatinous material consists essentially of a water-soluble lignosulfonate.

36. A composition of claim 33 in which the sulfonated polymer (i) used for forming said gelatinous material consists essentially of a condensed naphthalene sulfonate.

37. A composition of claim 33 in which the polymeric material (ii) used for forming said gelatinous material consists essentially of poly(monoallylamine) or poly(monoallylammonium chloride), or both.

38. A composition of claim 33 in which the polymeric material (ii) used for forming said gelatinous material is an uncrosslinked polymer.

39. A composition of claim 33 in which the sulfonated polymer (i) used for forming said gelatinous material consists essentially of sodium lignosulfonate or calcium lignosulfonate, or both; in which the polymeric material (ii) used for forming said gelatinous material consists essentially of poly(monoallylamine) or poly(monoallylammonium chloride), or both; and in which the slurry further includes at least calcium chloride or sodium chloride.

40. The process of forming a fluid-loss-control substance for use in well cementing which comprises interacting in an aqueous medium (i) a sulfonated polymer and (ii) a polymer of monoallylamine to form a gelatinous material capable of plugging porous zones in a subterranean well and minimizing premature dehydration of a cement slurry containing such material pumped into the well.

41. A process of claim 40 wherein the polymer of monoallylamine is a water-soluble polymer of monoallylamine.

42. A process of claim 41 in which the sulfonated polymer consists essentially of a water-soluble lignosulfonate.

43. A process of claim 41 in which the sulfonated polymer consists essentially of a condensed naphthalene sulfonate.

44. A process of claim 41 in which the polymeric material (ii) consists essentially of poly(monoallylamine) or poly(monoallylammonium chloride), or both.

45. A process of claim 41 in which the interaction is effected in the presence of slurried cement.

46. A process of claim 45 in which the sulfonated polymer consists essentially of a water-soluble lignosulfonate or a water-soluble condensed naphthalene sulfonate, or both; and in which the polymeric material (ii) consists essentially of poly(monoallylamine) or poly(monoallylammonium chloride), or both.

47. A fluid-loss-control substance for use in well cementing which comprises a gelatinous material formed by the interaction in the presence of water of (i) a sulfonated polymer and (ii) a polymer of monoallylamine.

48. A composition of claim 47 wherein said gelatinous material was formed by the interaction in an aqueous medium of a water-soluble sulfonated polymer and a water-soluble polymer of monoallylamine.

49. In a subterranean well formation containing a column of an aqueous slurry of uncured cement, the improvement pursuant to which said column contains a gelatinous material formed by the interaction in the presence of water of (i) a sulfonated polymer and (ii) a polymer of monoallylamine, said material stabilizing the column against excessive settling within the column prior to the curing of the cement.

50. The improvement of claim 49 wherein said gelatinous material was formed by the interaction of a water-soluble sulfonated polymer and a water-soluble polymer of monoallylamine in the aqueous slurry prior to forming said column in said well formation.

51. A composition of claim 1 in which component (i) consists essentailly of a sulfonated vinylaromatic polymer.

52. A composition of claim 7 in which component (i) consists essentially of a sulfonated vinylaromatic polymer.

53. A composition of claim 1 in which the polymer of monoallylamine is an unmodified polymer of monoallylamine.

54. A composition of claim 1 in which the polymer of monoallylamine is crosslinked with epichlorohydrin.

55. A composition of claim 1 in which the polymer of monoallylamine is crosslinked with a dihaloalkane.

56. A composition of claim 1 in which the polymer of monoallylamine is crosslinked with ethylene dichloride.

57. A composition of claim 1 in which the polymer of monoallylamine is predominantly poly(monoallylammonium chloride) crosslinked with epichlorohydrin.

58. A composition of claim 1 in which the polymer of monoallylamine is predominantly poly(monoallylammonium chloride) crosslinked with ethylene dichloride.

59. A fluid-loss-control additive adapted for use in cementing subterranean well formations with an aqueous well cement slurry, which additive comprises in combination, an anhydrous mixture of (i) a lignosulfonate polymer and (ii) a chemically modified polymer of monoallylamine represented by the general formula:

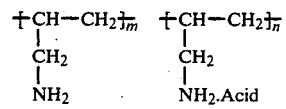

where m is a number above zero up to 100,000 and n is a number from zero to 100,000, the sum of m plus n being in the range of about 10 to about 100,000, said chemically modified polymer being crosslinked with dihaloalkane.

60. A composition of claim 59 in which said chemically modified polymer is crosslinked with ethylene dichloride.

61. A composition of claim 59 in which the amount of component (ii) falls in the range of from about 0.05 to about 10 parts by weight per each part by weight of component (i).

62. A composition of claim 61 in which "Acid" is HCl.

63. A fluid-loss-control additive adapted for use in cementing subterranean well formations with an aqueous well cement slurry, which additive comprises in combination, an anhydrous mixture of (i) a condensed naphthalene sulfonate polymer and (ii) a chemically modified polymer of monoallylamine represented by the general formula:

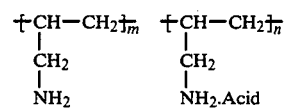

where m is a number above zero up to 100,000 and n is a number from zero to 100,000, the sum of m plus n being in the range of about 10 10 to about 100,000, said chemically modified polymer being crosslinked with dihaloalkane.

64. A composition of claim 63 in which said chemically modified polymer is crosslinked with ethylene dichloride.

65. A composition of claim 63 in which the amount of component (ii) falls in the range of from about 0.05 to about 10 parts by weight per each part by weight of component (i).

66. A composition of claim 65 in which "Acid" is HCl.

* * * * *

UNITED STATES PATENT AND TRADEMARK OFFICE
CERTIFICATE OF CORRECTION

PATENT NO. : 4,657,948           Page 1 of 2

DATED : APRIL 14, 1987

INVENTOR(S) : DAVID N. ROARK ET AL

It is certified that error appears in the above-identified patent and that said Letters Patent is hereby corrected as shown below:

Title page, References cited, reads "4,012,327  3/1977 Boothe" and should read -- 4,012,327  3/1977  Boothe et al. --.

Title page, References cited, reads "3,707,878" and should read -- 3,407,878 --.

Column 3, line 25, reads "soluole" and should read -- soluble --.

Column 4, line 45, reads "3-chlorol,2-epoxyheptane" and should read -- 3-chloro-1,2-epoxyheptane --.

Column 6, line 43, reads "cit ed" and should read -- cited --.

Column 8, line 55, reads "NaCl Sodium Chloride" and should read -- NaCl = Sodium Chloride --.

Column 9, line 60, reads "Mw" and should read -- $\overline{M}w$ --.

Column 13, line 63, reads "anydrous" and should read -- anhydrous --.

Column 14, line 54, reads "which the component" and should read -- which component --.

UNITED STATES PATENT AND TRADEMARK OFFICE
CERTIFICATE OF CORRECTION

PATENT NO. : 4,657,948

DATED : APRIL 14, 1987

INVENTOR(S) : DAVID N. ROARK ET AL

It is certified that error appears in the above-identified patent and that said Letters Patent is hereby corrected as shown below:

Column 15, line 21, reads "anc" and should read -- and --.

Column 16, line 1, reads "weight . falling" and should read -- weight falling --.

Column 18, line 48, reads "10 10" and should read -- 10 --.

Signed and Sealed this

Twenty-fifth Day of August, 1987

Attest:

DONALD J. QUIGG

Attesting Officer

Commissioner of Patents and Trademarks